(12) United States Patent
Seo et al.

(10) Patent No.: US 9,648,619 B2
(45) Date of Patent: *May 9, 2017

(54) METHOD FOR RELAYING DATA IN WIRELESS COMMUNICATION SYSTEM BASED ON TIME DIVISION DUPLEX

(71) Applicant: LG ELECTRONICS INC., Seoul (KR)

(72) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,910

(22) Filed: Apr. 25, 2016

(65) Prior Publication Data
US 2016/0242179 A1 Aug. 18, 2016

Related U.S. Application Data

(63) Continuation of application No. 13/143,644, filed as application No. PCT/KR2010/000068 on Jan. 6, 2010, now Pat. No. 9,344,186.

(Continued)

(30) Foreign Application Priority Data

May 12, 2009 (KR) ........................ 10-2009-0041083

(51) Int. Cl.
*H04W 72/04* (2009.01)
*H04B 7/26* (2006.01)
(Continued)

(52) U.S. Cl.
CPC .... *H04W 72/0446* (2013.01); *H04B 7/15507* (2013.01); *H04B 7/2656* (2013.01);
(Continued)

(58) Field of Classification Search
None
See application file for complete search history.

(56) References Cited

U.S. PATENT DOCUMENTS 8,054,767 B2 11/2011 Choi et al.
9,344,186 B2 * 5/2016 Seo ...................... H04B 7/2656
(Continued)

FOREIGN PATENT DOCUMENTS

CN 101106794 A 1/2008
WO WO 2008/156336 A1 12/2008

OTHER PUBLICATIONS

Alcatel Shanghai Bell et al. "Relaying for LTE-Advanced," 3GPP TSG RAN WG1 Meeting #55bis, Agenda Item 12.6, R1-090066, Ljubljana, Slovenia, Jan. 12-16, 2009, 9 pages.

(Continued)

*Primary Examiner* — Huy D Vu
*Assistant Examiner* — James P Duffy
(74) *Attorney, Agent, or Firm* — Birch, Stewart, Kolasch & Birch, LLP

(57) ABSTRACT

A method is provided for operating a relay station (RS) in a wireless communication system based on time division duplex (TDD) using a radio frame composed of a plurality of downlink subframes and at least one uplink subframe. A pair of subframes is determined to be used for communication between a base station (BS) and the RS. The pair of subframes comprises a configured downlink subframe and a configured uplink subframe. A signal is received from the BS in the configured downlink subframe which is configured by the RS as a multicast/broadcast single frequency network (MBSFN) subframe, and a signal is transmitted to the BS in the configured uplink subframe.

8 Claims, 13 Drawing Sheets

Related U.S. Application Data

(60) Provisional application No. 61/143,387, filed on Jan. 8, 2009, provisional application No. 61/155,892, filed on Feb. 26, 2009.

(51) Int. Cl.
*H04W 72/00* (2009.01)
*H04L 5/00* (2006.01)
*H04L 5/14* (2006.01)
*H04B 7/155* (2006.01)
*H04L 12/18* (2006.01)

(52) U.S. Cl.
CPC .......... *H04L 5/0055* (2013.01); *H04L 5/1469* (2013.01); *H04W 72/005* (2013.01); *H04W 72/042* (2013.01); *H04B 7/15528* (2013.01); *H04L 12/189* (2013.01)

(56) References Cited

U.S. PATENT DOCUMENTS

2004/0146013 A1 7/2004 Song et al.
2008/0232395 A1 9/2008 Buckley et al.
2009/0254790 A1* 10/2009 Pi .......................... H04L 1/1854
                                                                  714/749
2009/0279458 A1 11/2009 Shen et al.
2009/0312008 A1 12/2009 Lindoff et al.

OTHER PUBLICATIONS

Motorola, "LTE Signaling to Support Relay Operation," 3GPP TSG RAN WG1, Meeting #55, Agenda Item 11.5, R1-084412, Prague, Czech Republic, Nov. 10-14, 2008, 6 pages.

Nokia et al, "Considerations on TDD Relay," 3GPP TSG RAN WG1 Meeting #55bis, Agenda Item 12.6, R1-090244, Ljubljana, Slovenia, Jan. 12-16, 2009, 4 pages.

Qualcomm Europe, "Comparing Relay Support with MBSFN and Blank Subframes," 3GPP TSG RAN WG1, #55 Meeting, Agenda Item 6, R1-084515, Prague, Czech Republic, Nov. 10-14, 2008, 4 pages.

Ericsson, "Efficient support of relays through MBSFN subframes", R1-084357, TSG-RAN WG1 #55, Nov. 2008, 3 pages.

Qualcomm Europe, "Support of Rel-8 UEs by LTE-A Relays", R1-084384, 3GPP RAN WG1#55, Nov. 2008, 20 pages.

* cited by examiner

METHOD FOR RELAYING DATA IN WIRELESS COMMUNICATION SYSTEM BASED ON TIME DIVISION DUPLEX

CROSS REFERENCE TO RELATED APPLICATIONS

This application is a Continuation of U.S. application Ser. No. 13/143,644 filed on Jul. 7, 2011 (now U.S. Pat. No. 9,344,186 issued on May 17, 2016), which is the National Phase of PCT/KR2010/000068 filed on Jan. 6, 2010, which claims priority under 35 U.S.C. 119(e) to U.S. Provisional Application Nos. 61/143,387 and 61/155,892 filed on Jan. 8, 2009 and Feb. 26, 2009, respectively and under 35 U.S.C. 119(a) to Patent Application No. 10-2009-0041083 filed in the Republic of Korea on May 12, 2009, all of which are hereby expressly incorporated by reference into the present application.

BACKGROUND OF THE INVENTION

The present invention relates to wireless communications, and more particularly, to a method of relaying data by a relay station in a time division duplex (TDD)-based wireless communication system.

A transmission scheme used in a wireless communication system can be briefly classified into a frequency division duplex (FDD) scheme and a time division duplex (TDD) scheme. In the FDD scheme, uplink transmission and downlink transmission are achieved in the same time period while using different frequency bands. In the TDD scheme, uplink transmission and downlink transmission are achieved at different time periods while using the same frequency band.

Although the TDD scheme can use all available frequency bands, downlink transmission performed by a base station (BS) and uplink transmission performed by a mobile station (MS) cannot be simultaneously achieved since an uplink transmission time and a downlink transmission time are separated from each other. In a TDD system in which uplink transmission and downlink transmission are divided on a subframe basis, uplink transmission and downlink transmission are performed in different subframes.

A wireless communication system employing a relay station (RS) has recently been developed. The RS is a device that relays data between the BS and the MS, and is used for cell coverage extension and transmission capability improvement.

It is difficult for the RS to receive data from the BS while simultaneously transmitting data to the MS. In addition, it is difficult for the RS to receive data from the MS while simultaneously transmitting data to the BS. This is because a transmit (Tx) signal transmitted by the RS has much greater power than a receive (Rx) signal received by the RS, and thus the Tx signal of the RS may act as interference to the Rx signal, which may result in signal distortion. This is called self interference. In order for the RS to solve the self interference problem, a complex interference cancellation process and spatial separation of Tx/Rx signal processors are required. In reality, it is very difficult for the RS to cancel the self interference, and even if implemented, it will require large expenses. Therefore, it is generally assumed that it is difficult for the RS to simultaneously transmit and receive data by using the same frequency band.

Under the aforementioned assumption, the RS cannot simultaneously perform data reception from the BS and data transmission to the MS (or data transmission to the BS and data reception from the MS), and thus there is a problem in that the TDD system may have low efficiency of resource allocation.

In addition, uplink acknowledgment (ACK) collision is another problem. When the RS transmits data to the BS in a certain uplink subframe, the RS cannot receive data from the MS in the same uplink subframe. Therefore, when the MS transmits an ACK signal to the RS in the uplink subframe, the RS cannot receive the ACK signal. This is called uplink ACK collision. When the uplink ACK collision occurs, the RS cannot know whether the MS successfully receives data transmitted in a downlink subframe prior to the uplink subframe, and thus previously transmitted data may be retransmitted unnecessarily.

The aforementioned problems also occur in a wireless communication system employing a multicast/broadcast single frequency network (MBSFN) subframe-based scheme considered in a $3^{rd}$ generation partnership project (3GPP) evolved-universal terrestrial radio access network (E-UTRAN). The MBSFN subframe-based scheme is defined as a scheme in which the RS configures a corresponding downlink subframe as an MBSFN subframe when the BS transmits data to the RS.

Accordingly, there is a need for a method capable of effectively relaying data by an RS in a TDD-based wireless communication system.

SUMMARY OF THE INVENTION

The present invention provides a method of relaying data in a time division duplex (TDD)-based wireless communication system.

According to an aspect of the present invention, a method of relaying data in a wireless communication system based on TDD using a radio frame consisting of a plurality of downlink subframes and at least one uplink subframe is provided. The method includes configuring a downlink subframe as a multicast/broadcast single frequency network (MBSFN) subframe, receiving downlink data in the MBSFN subframe; and relaying uplink data to a base station in an uplink subframe, wherein the downlink subframe is linked to the uplink subframe which is reserved to transmit an acknowledgement (ACK)/non-acknowledgement (NACK) signal for downlink data transmission in the downlink subframe.

In a time division duplex (TDD)-based wireless communication system according to the present invention, efficiency of resource allocation can be increased, and uplink acknowledgement (ACK) collision can be avoided.

DETAILED DESCRIPTION OF THE PREFERRED EMBODIMENTS

Wideband CDMA (WCDMA) can be implemented with a wireless technique such as a universal terrestrial radio access network (UTRAN) defined by the $3^{rd}$ generation partnership project (3GPP) standardization organization. CDMA2000 is a wireless technique based on code division multiple access (CDMA). High rate packet data (HRPD) defined by the $3^{rd}$ generation partnership project 2 (3GPP2) provides a high-rate packet data service in a CDMA2000-based system. Evolved HRPD is an evolution of the HRPD. Time division multiple access (TDMA) can be implemented with a wireless technique such as global system for mobile communications (GSM)/general packet radio service (GPRS)/enhanced data rates for GSM evolution (EDGE). Orthogonal frequency division multiple access (OFDMA) can be implemented with a wireless technique such as IEEE 802.11(Wi-Fi), IEEE 802.16(WiMAX), IEEE 802.20, evolved-UTRAN (E-UTRAN), etc.

Long term evolution (LTE) is a part of an evolved-universal mobile telecommunications system (E-UMTS) using an evolved-universal terrestrial radio access network (E-UTRAN). The LTE employs the OFDMA in a downlink and employs single carrier-frequency division multiplex access (SC-FDMA) in an uplink. LTE-advance (LTE-A) is an evolution of the LTE. For clarity, the following description will focus on the 3GPP LTE/LTE-A. However, technical features of the present invention are not limited thereto.

Figure 1:
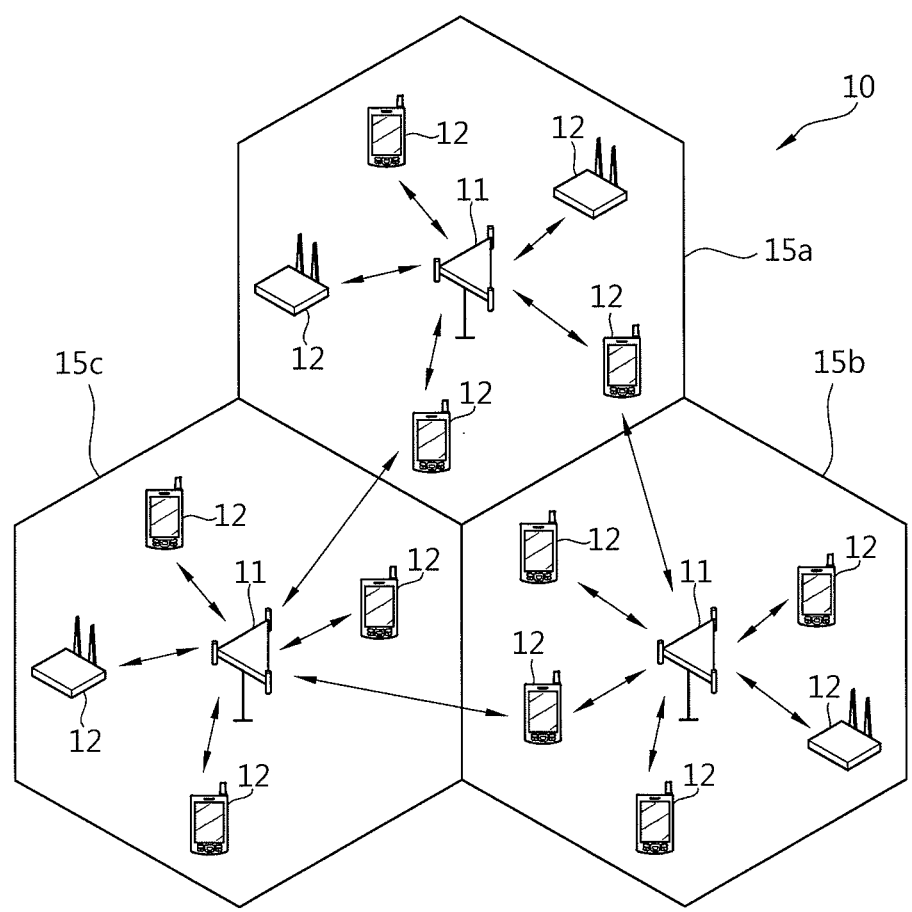
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). One or more cells may exist in the coverage of one BS.

A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, an access terminal (AT), etc. The BS 11 is generally a fixed station that communicates with the MS 12 and may be referred to as another terminology, such as an evolved node-B (eNB), a base transceiver system (BTS), an access point, an access network (AN), etc.

Hereinafter, a downlink (DL) implies communication from the BS to the MS, and an uplink (UL) implies communication from the MS to the BS. In the DL, a transmitter may be a part of the BS, and a receiver may be a part of the MS. In the UL, the transmitter may be a part of the MS, and the receiver may be a part of the BS.

Figure 2:
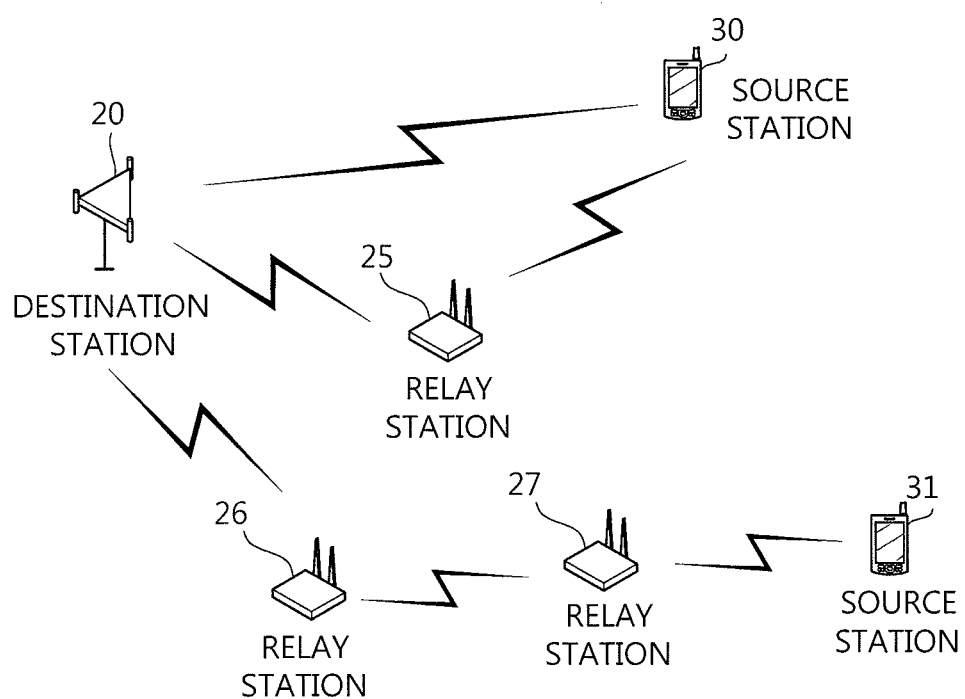
FIG. 2 shows a wireless communication system employing a relay station.

FIG. 2 shows a wireless communication system employing a relay station (RS).

In UL transmission, a source station may be an MS, and a destination station may be a BS. In DL transmission, the source station may be the BS, and the destination station may be the MS. The RS may be the MS, or may be provided as a separate RS. The BS may perform functions such as connectivity, management, control, and resource allocation between the RS and the MS.

Referring to FIG. 2, a destination station 20 communicates with a source station 30 via an RS 25. In UL transmission, the source station 30 transmits UL data to the destination station 20 and the RS 25, and the RS 25 retransmits the received data. The destination station 20 also communicates with a source station 31 via RSs 26 and 27. In UL transmission, the source station 31 transmits UL data to the destination station 20 and the RSs 26 and 27, and the RSs 26 and 27 retransmit the received data simultaneously or in sequence.

Although one destination station 20, three RSs 25, 26, and 27, and two source stations 30 and 31 are shown in FIG. 2, the present invention is not limited thereto. The number of destination stations, relay stations, and source stations included in the wireless communication system is not limited to any particular number.

A relay scheme used in the RS may be either amplify and forward (AF) or decode and forward (DF), and the technical features of the present invention are not limited thereto.

Figure 3:
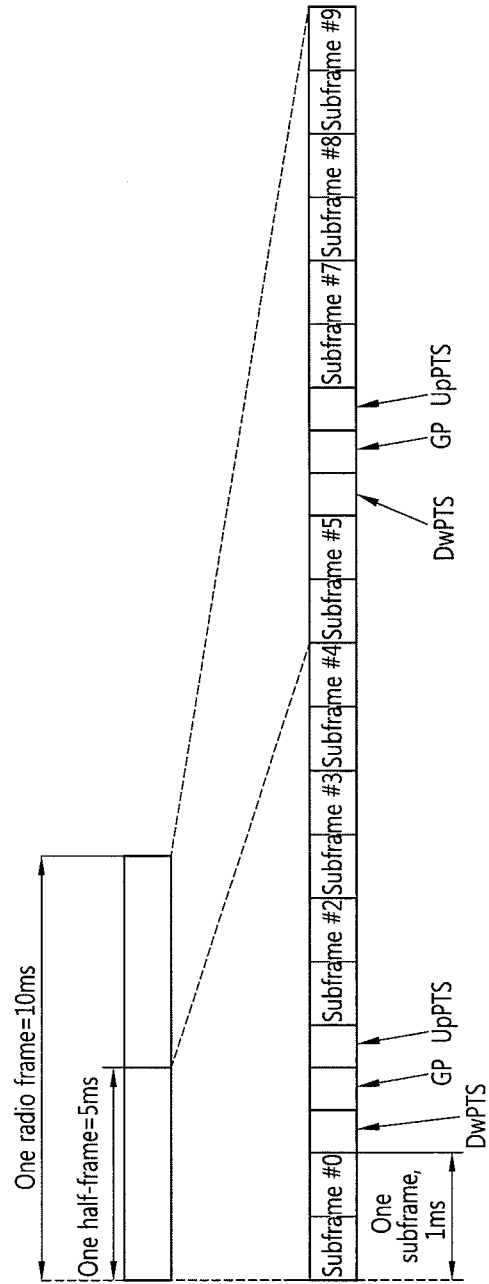
FIG. 3 shows a structure of a time division duplex (TDD) radio frame in a 3rd Generation Partnership Project (3GPP) long term evolution (LTE) system.

FIG. 3 shows a structure of a TDD radio frame in a 3GPP LTE system. Section 4.2 of the 3GPP TS 36.211 V8.3.0 (2008-05) "Technical Specification Group Radio Access Network; Evolved Universal Terrestrial Radio Access (E-UTRA); Physical Channels and Modulation (Release 8)" may be incorporated herein by reference.

Referring to FIG. 3, one radio frame has a length of 10 milliseconds (ms) and consists of two half-frames each having a length of 5 ms. One half-frame consists of five subframes each having a length of 1 ms. Each subframe is designated as any one of a UL subframe, a DL subframe, and a special subframe. One radio frame includes at least one UL subframe, at least one DL subframe, and at least one special subframe.

One subframe consists of two slots. For example, one subframe may have a length of 1 millisecond (ms), and one slot may have a length of 0.5 ms. A time for transmitting one subframe is defined as a transmission time interval (TTI). One slot includes a plurality of orthogonal frequency division multiplexing (OFDM) symbols in a time domain and includes a plurality of subcarriers in a frequency domain. The OFDM symbol is for expressing one symbol period since the 3GPP LTE uses OFDMA in a downlink. According to a multiple access scheme, the OFDM symbol may be referred to as an SC-FDMA symbol or a symbol period. A resource block (RB) is a resource allocation unit, and includes a plurality of consecutive OFDM symbols and a plurality of subcarriers in one slot.

The structure of the radio frame is for exemplary purposes only, and thus the number of subframes included in the radio frame or the number of slots included in the subframe, and the number of OFDM symbols included in the slot may change variously.

The special subframe is a specific period positioned between the UL subframe and the DL subframe for the purpose of UL-DL separation. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of an MS. The GP is positioned between the UL time slot and the DL time slot and is used to cancel interference that occurs in UL transmission due to a multi-path delay of a DL signal.

Figure 4:
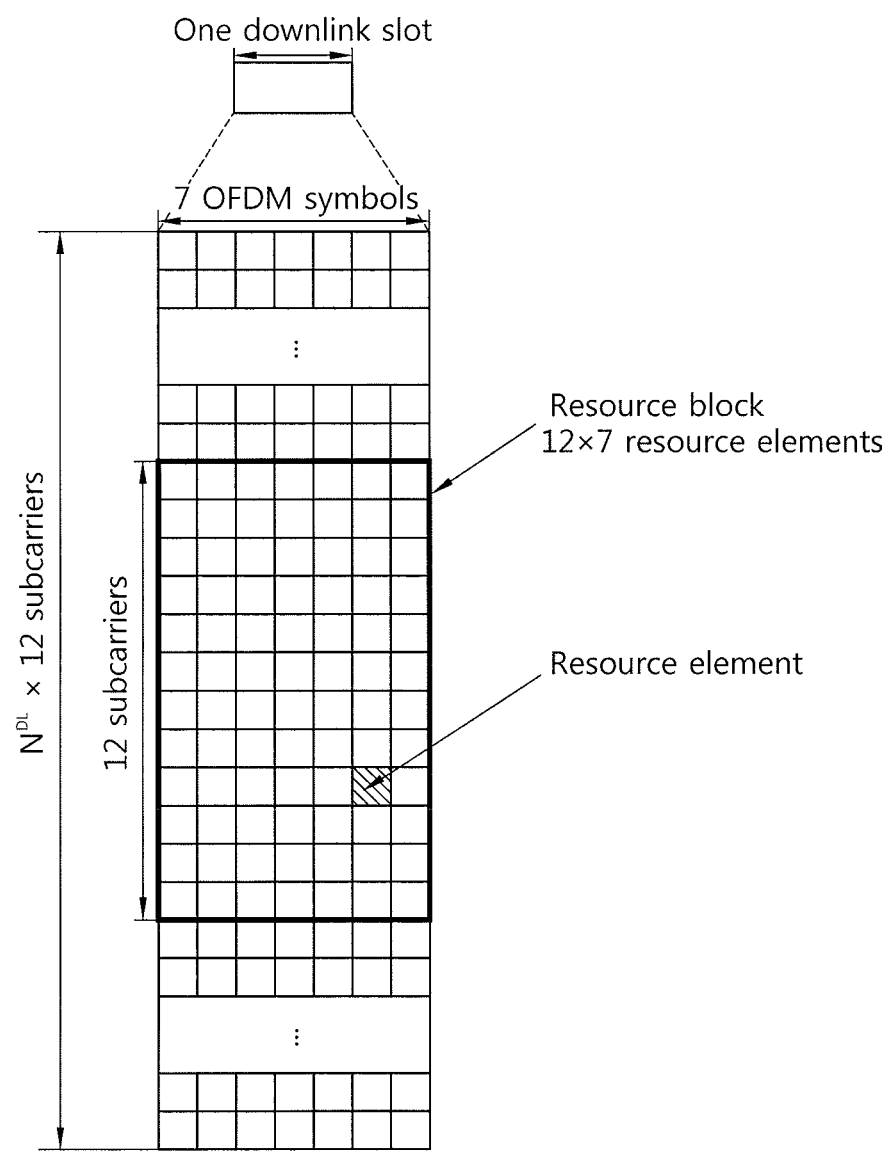
FIG. 4 shows an example of a resource grid for one slot.

FIG. 4 shows an example of a resource grid for one slot.

Referring to FIG. 4, a slot (e.g., a DL slot included in a DL subframe) includes a plurality of OFDM symbols in a time domain. It is described herein that one DL slot includes 7 OFDMA symbols and one resource block includes 12 subcarriers in a frequency domain for exemplary purposes only, and the present invention is not limited thereto.

Each element on the resource grid is referred to as a resource element, and one resource block includes 12×7=84 resource elements. The number $N^{DL}$ of resource blocks included in the DL slot depends on a DL transmission bandwidth determined in a cell.

Figure 5:
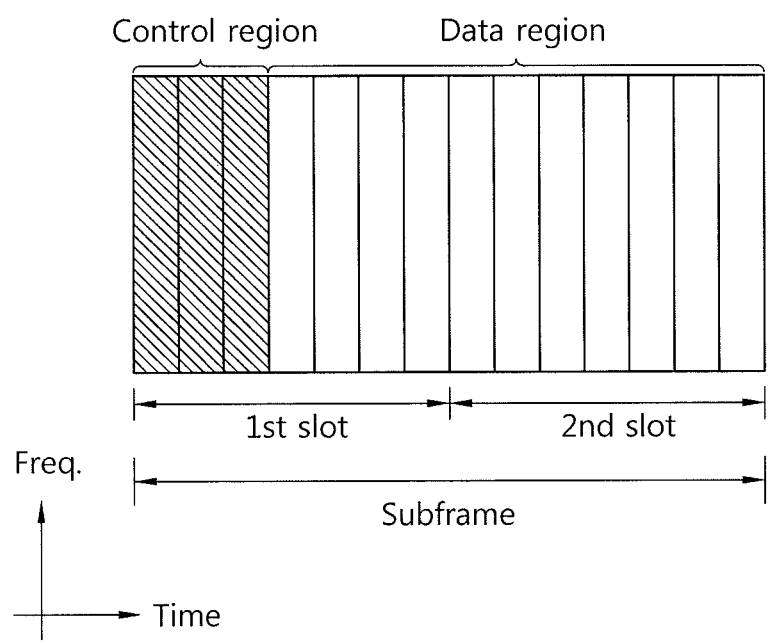
FIG. 5 shows an example of a downlink subframe structure.

FIG. 5 shows an example of a DL subframe structure.

Referring to FIG. 5, a subframe includes two slots. A maximum of three preceding OFDM symbols of a $1^{st}$ slot in the subframe may correspond to a control region to be allocated with control channels. The remaining OFDM symbols may correspond to a data region to be allocated with a physical downlink shared channel (PDSCH).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. Control information transmitted through the PDCCH is referred to as downlink control information (DCI). The DCI indicates UL resource allocation information, DL resource allocation information, a UL transmit power control command for any UE groups, etc. The PHICH carries an acknowledgement (ACK)/not-acknowledgement (NACK) signal for a UL hybrid automatic repeat request (HARQ). That is, the ACK/NACK signal for UL data transmitted by a UE is transmitted over the PHICH.

Now, a PDCCH which is a downlink physical channel will be described.

The PDCCH can carry a downlink shared channel (DL-SCH)'s resource allocation and transmission format, uplink shared channel (UL-SCH)'s resource allocation information, paging information on a PCH, system information on a DL-SCH, a resource allocation of a higher layer control message such as a random access response transmitted over a PDSCH, a transmit power control command for individual UEs included in any UE group, activation of a voice over Internet (VoIP), etc. A plurality of PDCCHs can be transmitted in a control region, and the UE can monitor the plurality of PDCCHs. The PDCCH is transmitted over an aggregation of one or several consecutive control channel elements (CCEs). The CCE is a logical allocation unit used to provide the PDCCH with a coding rate depending on a radio channel condition. The CCE corresponds to a plurality of resource element groups. According to an association relation between the number of CCEs and a coding rate provided by the CCEs, a format of the PDCCH and the number of bits of an available PDCCH are determined.

Control information transmitted through the PDCCH is referred to as downlink control information (DCI). Table 1 below shows the DCI according to a DCI format.

TABLE 1

| DCI format | Description |
| --- | --- |
| Format 0 | used for the scheduling of PUSCH (uplink grant). |
| Format 1 | used for the scheduling of one PDSCH codeword. |
| Format 1A | used for the compact scheduling of one PDSCH codeword. |
| Format 1C | used for very compact scheduling of one PDSCH codeword |
| Format 2 | used for scheduling PDSCH to UEs configured in spatial multiplexing mode |
| Format 3 | used for the transmission of TPC commands for PUCCH and PUSCH with 2-bit power adjustments. |
| Format 3A | used for the transmission of TPC commands for PUCCH and PUSCH with single bit power adjustments. |

A DCI format 0 indicates UL resource allocation information. DCI formats 1 to 2 indicate DL resource allocation information. DCI formats 3 and 3A indicate a UL transmit power control (TPC) command for any UE groups.

Table 2 below shows information elements included in the DCI format 0 which is UL resource allocation information (or a UL grant). Section 5.3.3.1 of the 3GPP TS 36.212 V8.3.0 (2008-05) "Technical Specification Group Radio Access Network; Evolved Universal Terrestrial Radio Access (E-UTRA); Multiplexing and channel coding (Release 8)" may be incorporated herein by reference.

TABLE 2

Flag for format0/format1A differentiation - 1 bit
Hopping flag - 1 bit
Resource block assignment and hopping resource allocation - $\lceil \log_2 (N_{RB}^{UL}(N_{RB}^{UL}+1) / 2) \rceil$ bits
For PUSCH hopping:
    $N_{UL\_hop}$ MSB bits are used to obtain the value of $\tilde{n}_{PRB}(i)$
    ($\lceil \log_2 (N_{RB}^{UL} (N_{RB}^{UL}+1) / 2) \rceil - N_{UL\_hop}$) bits provide the resource allocation of the first slot in the UL subframe
For non-hopping PUSCH:
    ($\lceil \log_2 (N_{RB}^{UL} (N_{RB}^{UL}+1) / 2) \rceil$) bits provide the resource allocation of the first slot in the UL subframe
Modulation and coding scheme and redundancy version - 5 bits
New data indicator - 1 bit
TPC command for scheduled PUSCH - 2 bits
Cyclic shift for DM RS - 3 bits
UL index - 2 bits (this field is present only for TDD operation)
CQI request - 1 bit Table 3 shows a structure of a configurable frame according to arrangement of UL subframes and DL subframes in a 3GPP LTE TDD system. In table 3, 'D' denotes a DL subframe, 'U' denotes a UL subframe, and 'S' denotes a special subframe.

TABLE 3

| UL-DL configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

When a radio communication system employs an RS, there is a need to define a subframe for receiving data transmitted from a BS and a subframe for transmitting data by the RS to the BS. The following aspects need to be considered in this case.

The RS can receive data transmitted from the BS by using a DL subframe. However, there is a restriction in that the RS cannot transmit data to an MS while simultaneously receiving the data from the BS in the DL subframe (such a restriction is referred to as a restriction 1). Therefore, the RS configures the DL subframe for receiving the data from the BS as a multicast/broadcast single frequency network (MBSFN) subframe, and then receives data from the BS. That is, the RS may configure a subframe indicated by a DL subframe 'D' in Table 3 as an MBSFN subframe, and then may receive data from the BS. Or a special subframe in Table 3 may be used for data transmission between a BS and an RS by transmitting data from BS to RS during a guard period (GP) of the special subframe.

The MBSFN subframe can be used for 2 purposes. The first purpose of use is for a multimedia broadcast multicast service (MBMS). The MBMS is a service for transmitting the same signal simultaneously in several cells of a wireless communication system. Since signals for the MBMS are transmitted simultaneously in the several cells, a reference signal has to be inserted in a manner different from that of unicast in which different data is transmitted in each cell. For this, the BS reports to the MS a position of a subframe in which an MBMS signal is transmitted, and a reference signal insertion method different from that of unicast is used in the subframe.

The second purpose of use is that the RS configures a DL subframe as an MBSFN subframe in order to report to the MS a subframe for receiving DL data from the BS. By the aforementioned restriction 1, the RS cannot transmit a signal to the MS in a subframe in which a signal is received from the BS. However, since the MS cannot know that no signal is transmitted from the RS in such a subframe, an unnecessary signal reception operation may be carried out. To avoid this, the RS configures a subframe for receiving a signal from the BS as an MBSFN subframe. In the present invention, the MBSFN subframe can be used for the second purpose of use.

Figure 6:
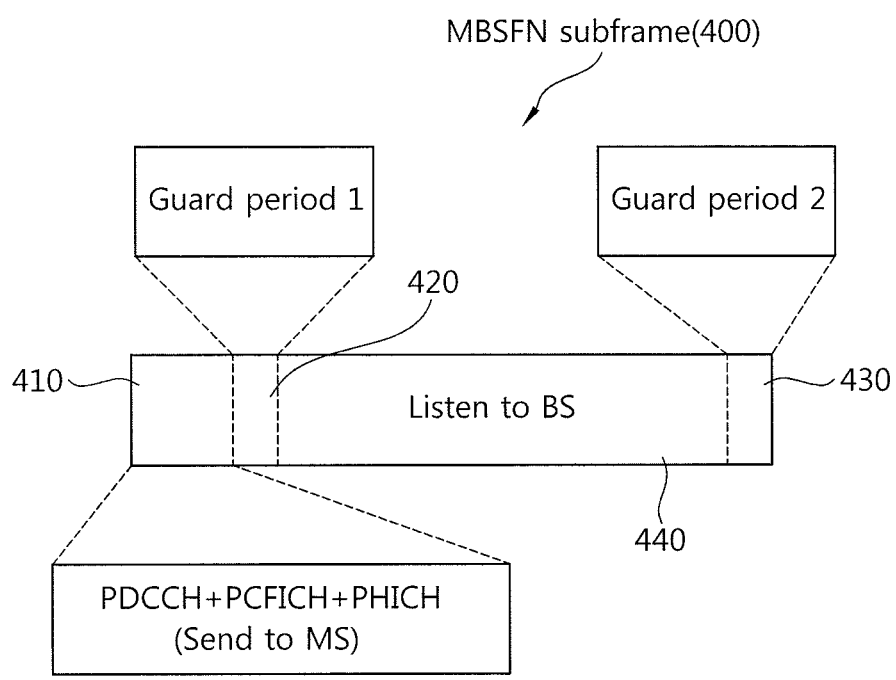
FIG. 6 shows a configuration of a multicast/broadcast single frequency network (MBSFN) subframe.

FIG. 6 shows a configuration of an MBSFN subframe.

Referring to FIG. 6, an MBSFN subframe 400 includes a control region 410, a guard period-1 420, a guard period-2 430, and a data region 440.

The control region 410 is an area in which control signals of control channels (e.g., PCFICH, PDCCH, PHICH, etc.) are included. These control signals may report that DL data will not be transmitted to MSs, so that the MSs do not perform an unnecessary data reception operation. That is, an RS may transmit a control signal of the control region 410 to the MS in a subframe configured as an MBSFN subframe, and thereafter may receive data from a BS in the data region 440 after the guard period-1 420.

The guard period-1 420 and the guard period-2 430 are time durations for cancelling interference between data transmission and data reception. One or both of the two guard periods in FIG. 6 may not appear (i.e., zero length guard period) depending on the structure of the subframe used for the transmission from BS to RS.

There is a restriction when the RS configures a DL subframe (or a special subframe, and the same is true hereinafter) as the aforementioned MBSFN subframe. The restriction is that there is a DL subframe which cannot be configured as the MBSFN subframe since an important control signal such as a synchronization signal (e.g., a primary synchronization signal and a secondary synchronization signal) has to be transmitted to the MS. The DL subframe corresponds to subframes 0, 1, 5, and 6 in all configurations of the radio frame of Table 3. In other words, in all configuration of the radio frame described in Table 3, the RS cannot configure the subframes 0, 1, 5, and 6 as MBSFN subframes (hereinafter, such a restriction will be referred to as a restriction 2).

The RS can transmit data to the BS by using a UL subframe. However, the RS cannot transmit data to the BS in all UL subframes of Table 3 above (hereinafter, such a restriction will be referred to as a restriction 3), because UL ACK collision may occur. The UL ACK collision implies a case where the BS or the RS transmits a signal in a UL subframe and thus cannot receive ACK/NACK transmitted by the MS. At the occurrence of the UL ACK collision, the BS or the RS cannot confirm success or failure of reception of the MS, which may result in unnecessary retransmission. This may cause waste of radio resources.

When the BS transmits data in a DL subframe, the MS transmits an acknowledgement (ACK)/non-acknowledgement (NACK) signal for corresponding DL data in a UL subframe after a specific time elapses. The 3GPP LTE TDD system defines a UL subframe for transmitting an ACK/NACK signal for DL data.

Table 4 shows an index of a UL subframe in which ACK/NACK is transmitted for corresponding DL data by the MS, with respect to each configuration of Table 3 above. Section 10.2 of the 3GPP TS 36.213 V8.3.0 (2008-05) "Technical Specification Group Radio Access Network; Evolved Universal Terrestrial Radio Access (E-UTRA); Physical layer procedures (Release 8)" may be incorporated herein by reference.

TABLE 4

| UL-DL configuration | DL subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In Table 4, '-' indicates that a subframe is configured as a UL subframe, and a numerical symbol indicates a subframe number of a linked UL subframe in a corresponding DL subframe. Herein, the linked UL subframe is a UL subframe for transmitting an ACK/NACK signal when data is transmitted in a DL subframe. For example, in a configuration 0 (i.e., UL-DL configuration 0), an ACK/NACK signal for DL data transmitted in a subframe 0 is transmitted in a subframe 4 which is a UL subframe, and an ACK/NACK signal for DL data transmitted in a subframe 6 is transmitted in a subframe 2 of a next radio frame. In addition, in a configuration 1 (i.e., UL-DL configuration 1), an ACK/NACK signal for DL data transmitted in subframes 0 and 1 which are DL subframes is transmitted in a subframe 7 which is a UL subframe.

A linked DL subframe is a DL subframe for transmitting a data which is linked to ACK/NACK signal transmitted in a UL subframe. For example, in a configuration 1 of Table 4, a DL subframe linked to a subframe 8 which is a UL subframe is a subframe 4. That is, the RS transmits data in the subframe 4, and the MS transmits an ACK/NACK signal in the subframe 8.

Figure 7:
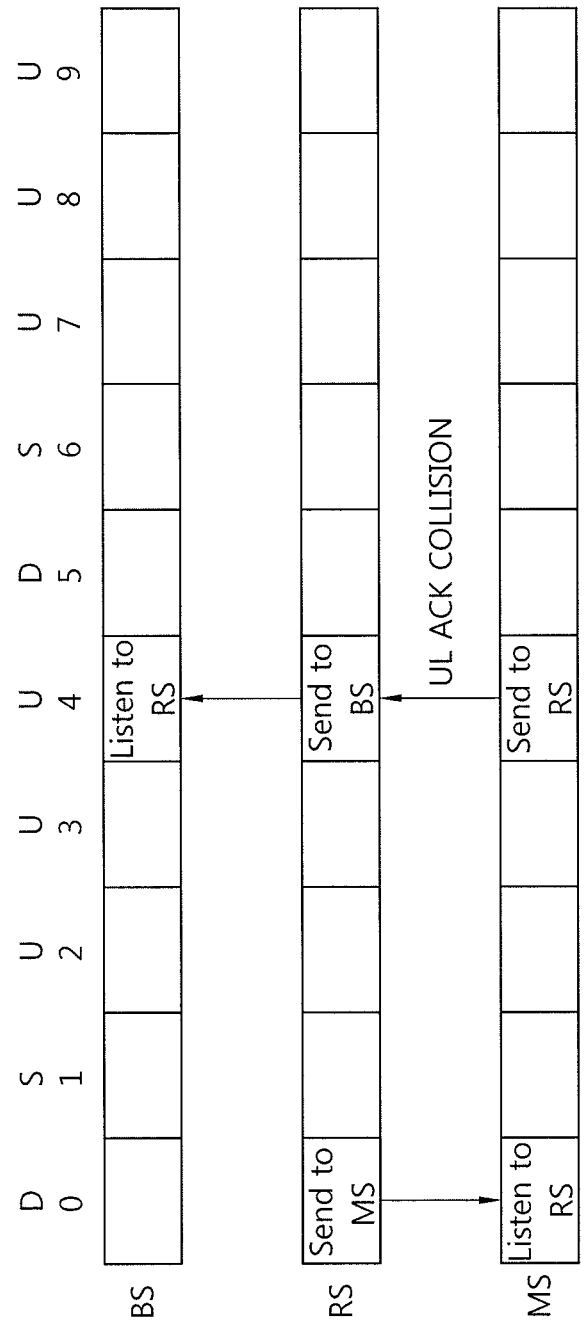
FIG. 7 shows occurrence of uplink acknowledgment (ACK) collision in a configuration 0 of Table 4 described in the present invention.

FIG. 7 shows occurrence of UL ACK collision in the configuration 0 of Table 4 above. Referring to FIG. 7, an MS receives DL data in a subframe 0, and an RS transmits data to a BS in a subframe 4 which is a UL subframe. Meanwhile, referring to Table 4 above, ACK/NACK for DL data received in the subframe 0 is reserved to be transmitted in the subframe 4. Therefore, when the MS transmits ACK/NACK in the subframe 4, the RS cannot receive the ACK/NACK, resulting in occurrence of UL ACK collision.

Table 5 shows a UL subframe for transmitting data by the RS to the BS and a DL subframe configured as an MBSFN subframe to receive data by the RS from the BS in the radio frame configuration of Table 3 by considering the aforementioned restrictions 1, 2, and 3.

TABLE 5

| UL-DL Configuration | Subframe number of UL subframe | Subframe number of DL subframe configured as MBSFN subframe |
|---|---|---|
| 1 | 3 | 9 |
|   | 8 | 4 |
| 3 | 3 | 7, 8 |
| 6 | 4 | 9 |

That is, the RS configures a DL subframe (e.g., a DL subframe 9 of the configuration 1 of Table 3) linked to a UL subframe (e.g., a UL subframe 3 of the configuration 1 of Table 3) as an MBSFN subframe, and receives DL data in the MBSFN subframe. Then, the RS relays UL data to the BS in the UL subframe (e.g., a UL subframe 3 of the configuration 1 of Table 3). As described above, according to the configuration of Table 5, the RS can communicate with the BS without occurrence of UL ACK collision.

Hereinafter, a data relay method will be described according to another embodiment of the present invention.

Figure 8:
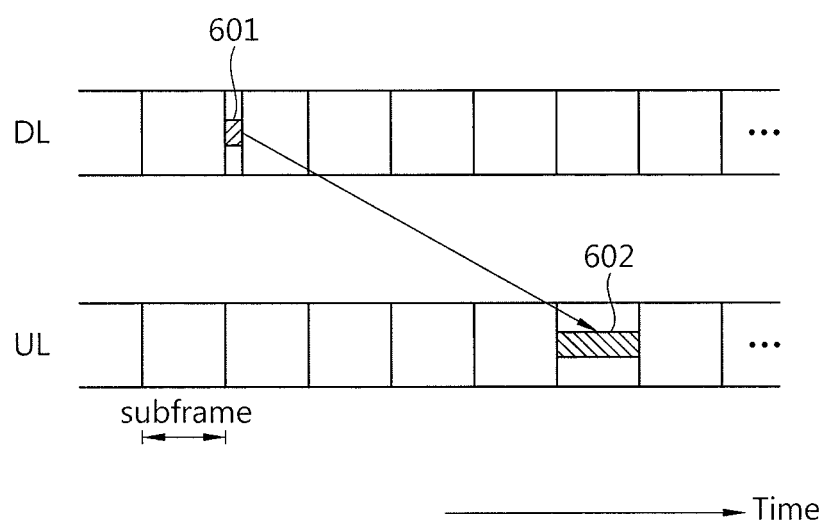
FIG. 8 shows an example of uplink data transmission.

FIG. 8 shows an example of UL data transmission. Referring to FIG. 8, an MS monitors a PDCCH in a DL subframe and receives a DCI format-0 601 (i.e., UL resource allocation) over the PDCCH. UL data 602 is transmitted over a PUSCH configured based on the UL resource allocation. That is, the MS receives a UL scheduling message (i.e., UL resource allocation related information, for example, DCI format information, etc.) in a DL subframe, and thereafter transmits UL data in a corresponding UL subframe according to the UL scheduling message.

Figure 9:
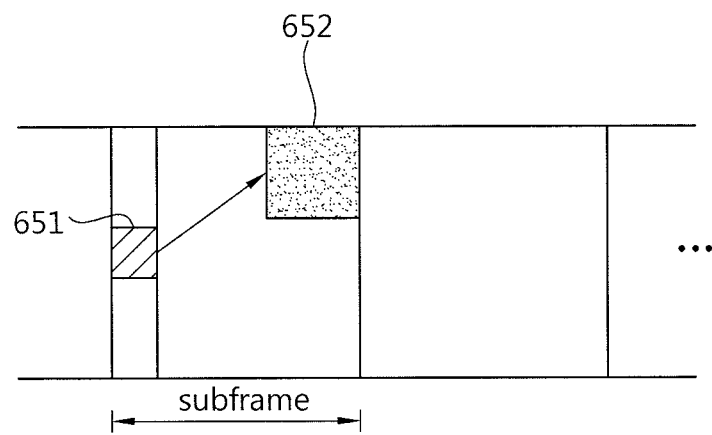
FIG. 9 shows an example of downlink data reception.

FIG. 9 shows an example of DL data reception. An MS receives DL data over a PDSCH 652 indicated by a PDCCH 651. The MS monitors the PDCCH 651 in a DL subframe and receives DL resource allocation information over the PDCCH 651. The MS receives DL data over the PDSCH 652 indicated by the DL resource allocation information.

Table 6 shows an index (i.e., a subframe number) of a DL subframe for transmitting a UL scheduling message for UL data transmission of the MS in each UL subframe.

TABLE 6

| UL-DL configuration | UL subframe number | | | | | | | | | |
|---|---|---|---|---|---|---|---|---|---|---|
|  | 0 | 1 | 2 | 3 | 4 | 5 | 6 | 7 | 8 | 9 |
| 1 | — | — | 6 | 9 | — | — | — | 1 | 4 | — |
| 2 | — | — | 8 | — | — | — | — | 3 | — | — |
| 3 | — | — | 8 | 9 | 0 | — | — | — | — | — |
| 4 | — | — | 8 | 9 | — | — | — | — | — | — |
| 5 | — | — | 8 | — | — | — | — | — | — | — |
| 6 | — | — | 5 | 6 | 9 | — | — | 0 | 1 | — |

In a UL-DL configuration 1 of Table 6, UL data transmission of the MS in a subframe 3 is performed by using resource allocation information included in a UL scheduling message of a subframe 9 (of a previous radio frame). In this case, an empty PDCCH may be problematic in comparison with Table 3 and Table 4 above.

Figure 10:
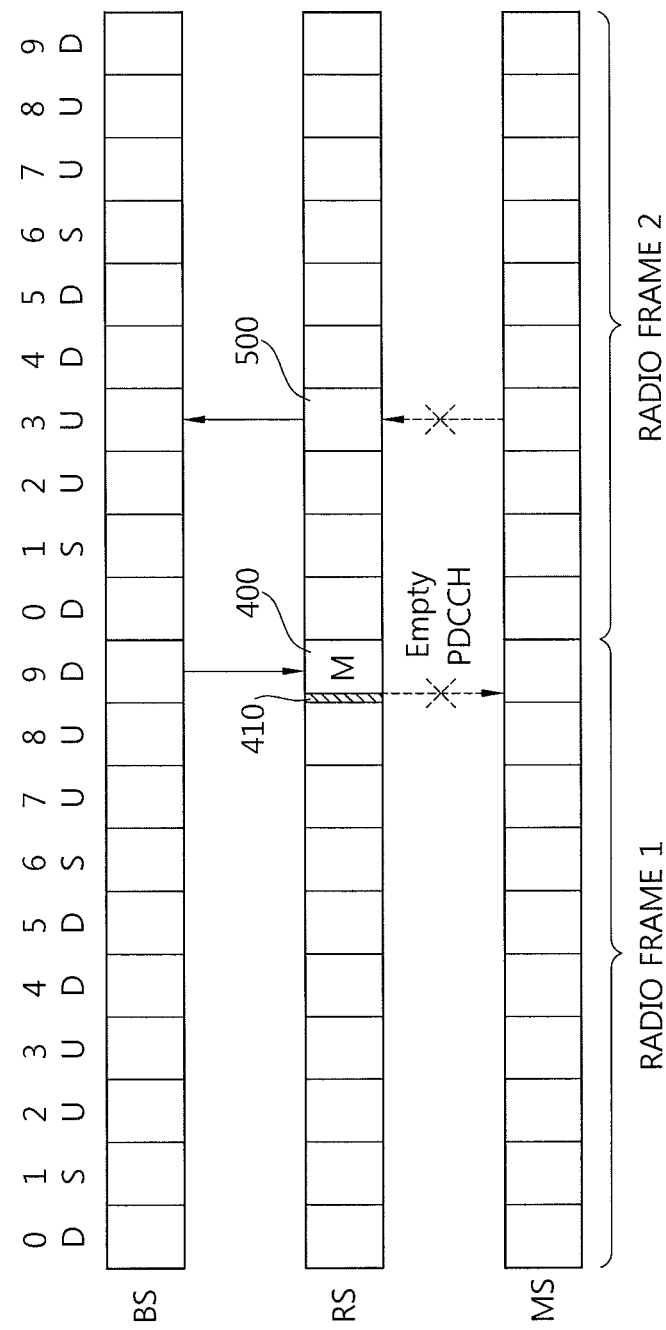
FIG. 10 shows an empty physical downlink control channel (PDCCH) problem that occurs in a configuration 1 of Table 6 described in the present invention.

FIG. 10 shows an empty PDCCH problem that occurs in the configuration 1 of Table 6.

Referring to FIG. 10, an RS receives data from a BS by configuring a subframe 9 (400) of a radio frame 1 as an MBSFN subframe. Then, data is transmitted to the BS in a subframe 3 (500) of a radio frame 2. As described above with reference to Table 6, a UL scheduling message for transmitting data by an MS to an RS in the subframe 3 (500) of the radio frame 2 is transmitted from the RS to the MS in a control region (e.g., PDCCH 410) of the subframe 9 (400). The RS cannot receive data from the MS in the subframe 3 (500) of the radio frame 2 (restriction 1), and thus the RS does not include any UL scheduling message in the control region 410 in the subframe 9 (400) of the radio frame 1, thereby causing waste of radio resources.

In a data relay method for solving these problems according to another embodiment of the present invention, UL scheduling timing is regulated to transmit a UL scheduling message for other UL subframes (i.e., unlinked UL subframe) in an MBSFN subframe, expect for a UL subframe linked to the MBSFN subframe.

Figure 11:
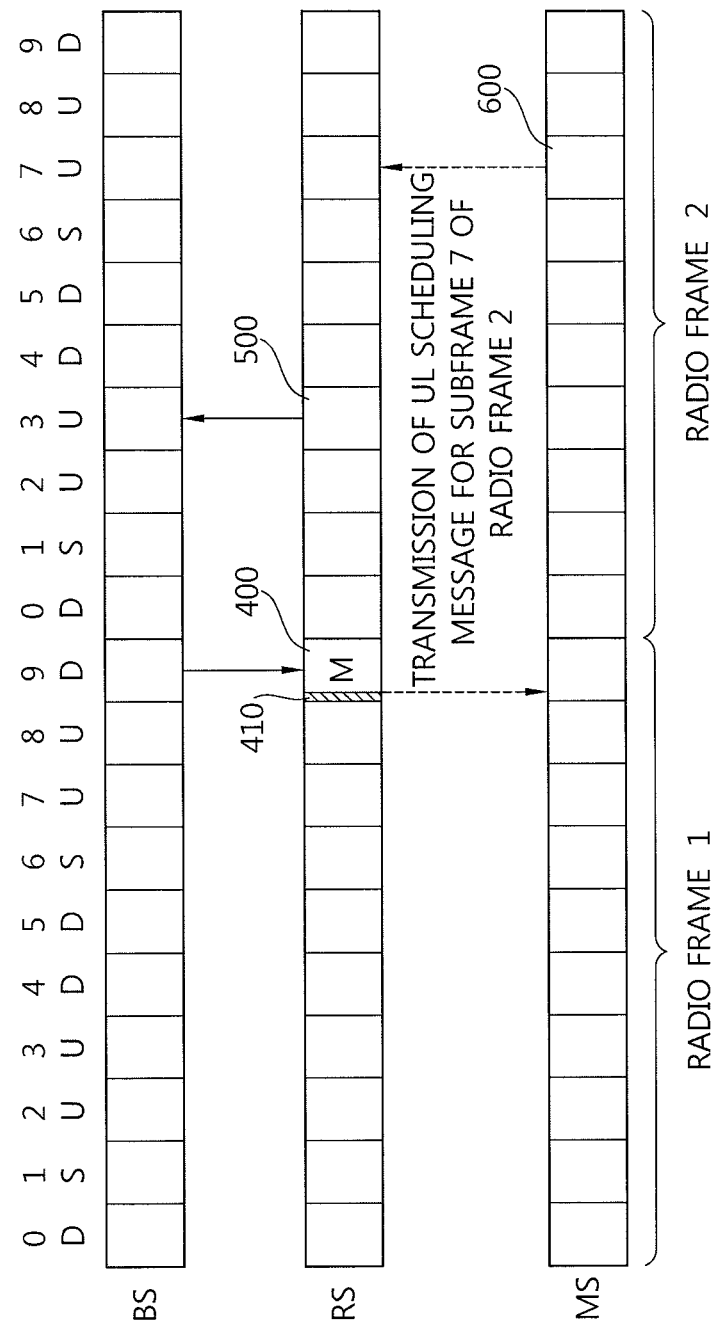
FIG. 11 shows a case of transmitting an uplink scheduling message for an unlinked uplink subframe in an MBSFN subframe.

FIG. 11 shows a case of transmitting a UL scheduling message for an unlinked UL subframe in an MBSFN subframe.

Referring to FIG. 11, in a PDCCH region 410 of a subframe 9 (400) of a radio frame 1, wherein the subframe 9 (400) is configured as an MBSFN subframe, a UL scheduling message for a subframe 3 of a radio frame 2 is not transmitted, but a UL scheduling message for a subframe 7 (600) of the radio frame 2 is transmitted.

A method of regulating UL scheduling timing may be implemented by using a PDCCH of the MBSFN subframe or by using a higher-layer signal.

For example, an information field included in the PDCCH of the MBSFN subframe may include at least one of a UL subframe index, a UL subframe offset, and a UL subframe position indicator.

The UL subframe index may directly indicate a different UL subframe other than a UL subframe linked to the MBSFN subframe. For example, if the subframe 9 is configured as the MBSFN subframe in the configuration 1 of Table 6, a UL subframe index included in the PDCCH of the subframe 9 may indicate not the subframe 3 but the subframe 7 (by directly indicating a subframe number).

The UL subframe offset may be added to a value defined in Table 6 to indicate the different UL subframe other than the UL subframe linked to the MBSFN subframe. For example, if the subframe 9 is configured as the MBSFN subframe in the configuration 1 of Table 6, a UL subframe offset included in the PDCCH of the subframe 9 may be assigned to 4. Then, the MS may interpret that the UL scheduling message included in the subframe 9 is a UL scheduling message for the subframe 7.

The UL subframe position indicator may be information indicating that a UL scheduling message corresponds to a UL subframe located in a specific order after the subframe defined in Table 6. For example, if the subframe 9 is configured as the MBSFN subframe in the configuration 1 of Table 6, the UL subframe position indicator included in the PDCCH of the subframe 9 may be assigned to 1. Then, the MS may interpret that the UL scheduling message included in the MBSFN subframe (i.e., the subframe 9) is for the subframe 7, that is, first UL subframe after the subframe 3 which is a UL subframe defined in the configuration 1 of Table 6.

Although the UL scheduling timing can be regulated by using the PDCCH of the MBSFN subframe as described above, the higher-layer signal can also be used. That is, the RS may provide the MS with higher-layer signals respectively corresponding to the UL subframe index, UL subframe offset, and UL subframe position indicator delivered on the PDCCH of the MBSFN subframe.

In a data relay method according to still another embodiment of the present invention, DL scheduling timing may be regulated to transmit a DL scheduling message for a DL subframe which is not the MBSFN subframe (i.e., a non-MBSFN subframe) in a DL subframe linked to transmit a DL scheduling message for the MBSFN subframe.

For example, assume that a DL scheduling message for a DL subframe 8 is transmitted over a PDCCH of a DL subframe 3. In this case, if the DL subframe 8 is configured as the MBSFN subframe, an RS cannot transmit data to an MS since the RS receive data from a BS. Therefore, no DL scheduling message is included in the PDCCH of the DL subframe 3. As a result, a PDCCH region of the DL subframe 3 is wasted. To solve such a problem, it is preferable to transmit a DL scheduling message for a DL subframe which is not configured as an MBSFN subframe in the PDCCH of the DL subframe 3.

A method of regulating DL scheduling timing can be implemented by transmitting a DL subframe index similarly to the aforementioned method of regulating UL scheduling time, or by transmitting an offset value, or by transmitting information indicating that a UL scheduling message corresponds to a DL subframe located in a specific order after a linked DL subframe.

Hereinafter, a data relay method using a special subframe will be described.

The special subframe may be used for data transmission between a BS and an RS. The BS may transmit data to the RS during a guard period (GP) of the special subframe. This is because an MS connected to the RS knows that a reference signal is not transmitted from the RS during that period.

Figure 12:
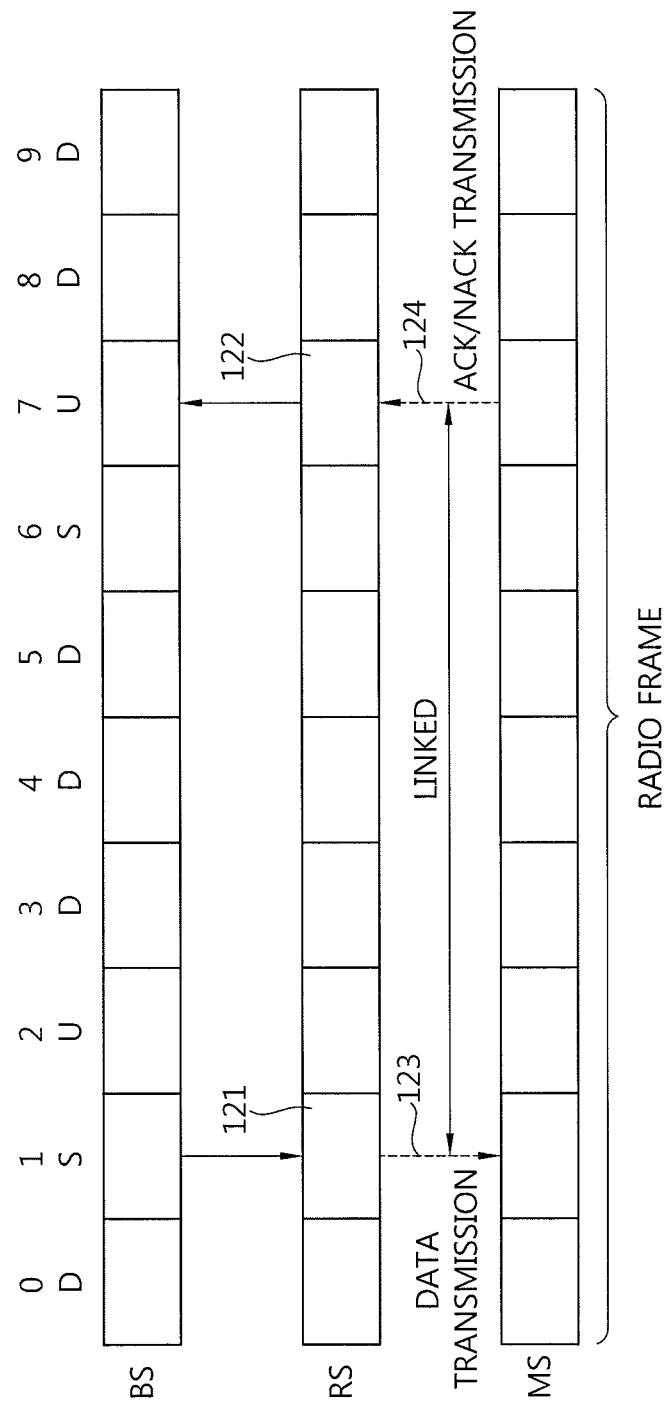
FIG. 12 shows an example of a data relay method using a special subframe.

FIG. 12 shows an example of a data relay method using a special subframe.

Referring to FIG. 12, an RS receives data from a BS in a special subframe 121, and then transmits data to the BS in a UL subframe 122. In this case, the UL subframe is linked to the special subframe. If the UL subframe is linked to the special subframe, it implies that when the RS transmits data to the MS through a physical downlink shared channel (PDSCH) of the special subframe (indicated by a flow arrow 123), the MS transmits an ACK/NACK signal corresponding to that data in the UL subframe (indicated by a flow arrow 124). In other words, the RS receives data from the BS in the special subframe 121, and the RS transmits data to the BS in the UL subframe 122. Here the UL subframe 122 is a subframe in which the MS will transmit an ACK/NACK signal to the RS if the PDSCH is sent in the special subframe 121. UL ACK/NACK collision can be avoided by performing such an operation.

Table 7 shows a possible pair of a special subframe in which the BS transmits data to the RS and a UL subframe in which the RS transmits data to the BS (i.e., a UL subframe linked to the special subframe).

TABLE 7

| UL-DL Configuration | Subframe number of special subframe | Subframe number of UL subframe linked to special subframe |
|---|---|---|
| 0 | 1 | 7 |
|   | 6 | 2 |
| 1 | 1 | 7 |
|   | 6 | 2 |
| 2 | 1 | 7 |
|   | 6 | 2 |
| 3 | 1 | 2 |
| 4 | 1 | 2 |
| 6 | 1 | 8 |
|   | 6 | 3 |

According to Table 7, if the BS transmits data to the RS in a subframe 1 which is a special subframe for example in a configuration 2 (i.e., UL-DL configuration 2), the RS transmits data to the BS in a subframe 7.

However, in the configuration 2, the subframe 7 is linked to not only the subframe 1 which is a special subframe but also subframes 0, 3, and 9 which are DL subframes (see Table 4 above). In this case, the subframes 3 and 9 as well as the subframe 1 can be used when the BS transmits data to the RS. That is, if a UL subframe linked to a special subframe is also linked to a DL subframe, the RS can receive DL data in that DL subframe. However, due to the aforementioned restrictions 1 and 2, the subframes 0 and 5 cannot be used when the BS transmits data to the RS (i.e., the RS cannot receive data from the BS).

Table 8 shows a possible pair of a special subframe and DL subframe, in which the BS can transmit data to the RS, and a UL subframe, in which the RS can transmit data to the BS, when a plurality of subframes are linked to a UL subframe.

TABLE 8

| UL-DL Configuration | Subframe number of special subframe and DL subframe | Subframe number of linked UL subframe |
|---|---|---|
| 2 | 9, 1, 3 | 7 |
|   | 4, 6, 8 | 2 |
| 3 | 1, 6 | 2 |
| 4 | 1, 4 | 2 |

In Table 8, if the BS transmits data to the RS in any one of subframes 9, 1, and 3 in a configuration 2 (i.e., UL-DL configuration 2), the RS transmits data to the BS in a subframe 7.

Figure 13:
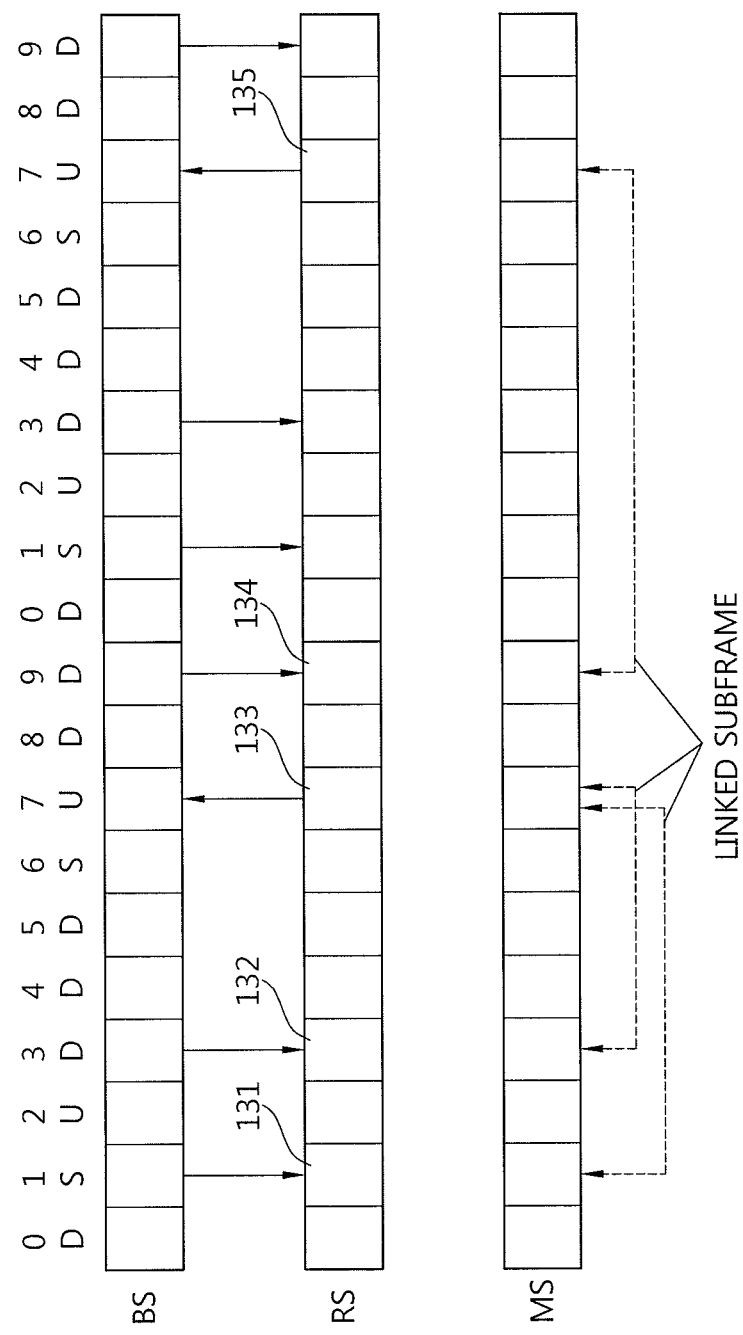
FIG. 13 shows an example of a data relay method of a base station and a relay station when a plurality of subframes are linked to an uplink subframe.

FIG. 13 shows an example of a data relay method of a BS and an RS when a plurality of subframes are linked to a UL subframe.

Referring to FIG. 13, if the BS transmits data to the RS in at least one of a subframe 1 (131) and a subframe 3 (132), the RS transmits data to the BS in a subframe 7 (133). When the BS transmits data to the RS in a subframe 9 (134), the RS transmits data to the RS in a subframe 7 (135) of a next radio frame (see the configuration 2 of Table 8).

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for operating a relay station (RS) in a wireless communication system based on time division duplex (TDD) using a radio frame consisting of a plurality of downlink subframes and at least one uplink subframe, the method comprising:
   determining a pair of subframes to be used for communication between a base station (BS) and the RS;
   wherein the pair of subframes comprises a configured downlink subframe and a configured uplink subframe;
   receiving a signal from the BS in the configured downlink subframe which is configured by the RS as a multicast/broadcast single frequency network (MBSFN) subframe; and
   transmitting a signal to the BS in the configured uplink subframe,
   wherein each radio frame consists of 10 subframes and the 10 subframes are indexed from 0 to 9,
   wherein a downlink subframe configured to a user equipment (UE) and an uplink subframe which is configured to the UE to transmit an acknowledgement/not-acknowledgement (ACK/NACK) for the downlink subframe are determined according to an uplink-downlink configuration as indicated in Table 1 below,
   wherein if the uplink-downlink configuration is Uplink-Downlink Configuration 6 in the Table 1, the configured downlink subframe comprises only a subframe 9 of the first radio frame and the configured uplink subframe comprises only a subframe 4 of the second radio frame,

TABLE 1

| Uplink-Downlink Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 | wherein a subframe having '-' under "Subframe number" in the Table 1 is an uplink subframe and a subframe having a number under "Subframe number" in the Table 1 is a downlink subframe, and each number indicates a number of an uplink subframe which is configured to transmit an ACK/NACK for a corresponding downlink subframe.

2. The method of claim 1, wherein if the uplink-downlink configuration is Uplink-Downlink Configuration 3 in the Table 1, the configured downlink subframe comprises a subframe 7 or subframe 8 of the first radio frame, and the configured uplink subframe is a subframe 3 of the second radio frame.

3. The method of claim 1, wherein a control signal which indicates downlink data is not transmitted in the configured downlink subframe is transmitted to the UE at a control region of the configured downlink subframe.

4. The method of claim 1, wherein the second radio frame is a radio frame next to the first radio frame.

5. A relay station (RS) in a wireless communication system based on time division duplex (TDD) using a radio frame consisting of a plurality of downlink subframes and at least one uplink subframe, the RS comprising:
   a radio frequency (RF) unit configured to transmit and receive a radio signal; and
   a processor operationally connected with the RF unit,
   wherein the processor is configured to:
      determine a pair of subframes to be used for communication between a base station (BS) and the RS, wherein the pair of subframes comprise a configured downlink subframe and a configured uplink subframe,
      receive a signal from the BS in the configured downlink subframe which is configured by the RS as a multicast/broadcast single frequency network (MBSFN) subframe, and
      transmit a signal to the BS in the configured uplink subframe,
   wherein each radio frame consists of 10 subframes and the 10 subframes are indexed from 0 to 9,
   wherein a downlink subframe configured to a user equipment (UE) and the uplink subframe which is configured to the UE to transmit an acknowledgement/not-acknowledgement (ACK/NACK) for the downlink subframe are determined according to an uplink-downlink configuration as indicated in Table 1 below,
   wherein if the uplink-downlink configuration is Uplink-Downlink Configuration 6 in the Table 1, the configured downlink subframe comprises only a subframe 9 of the first radio frame and the configured uplink subframe comprises only a subframe 4 of the second radio frame,

TABLE 1

| Uplink-Downlink Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 | wherein a subframe having '-' under "Subframe number" in the Table 1 is an uplink subframe and a subframe having a number under "Subframe number" in the Table 1 is a downlink subframe, and each number indicates a number of an uplink subframe which is configured to transmit an ACK/NACK for a corresponding downlink subframe.

6. The RS of claim 5, wherein if the uplink-downlink configuration is Uplink-Downlink Configuration 3 in the Table 1, the configured downlink subframe comprises a subframe 7 or subframe 8 of the first radio frame, and the configured uplink subframe is a subframe 3 of the second radio frame.

7. The RS of claim 5, wherein a control signal which indicates downlink data is not transmitted in the configured downlink subframe is transmitted to the UE at a control region of the configured downlink subframe.

8. The RS of claim 5, wherein the second radio frame is a radio frame next to the first radio frame.

* * * * *